United States Patent [19]

Voit et al.

[11] Patent Number: 5,659,605
[45] Date of Patent: Aug. 19, 1997

[54] METHOD AND APPARATUS FOR PROVIDING SOFT DIAL TONE USING OFFICE EQUIPMENT DESIGNATORS

[75] Inventors: Eric A. Voit, Baltimore; William G. Giles, Annapolis, both of Md.

[73] Assignee: Bell Atlantic Network Services, Inc., Arlington, Va.

[21] Appl. No.: 264,166

[22] Filed: Jun. 22, 1994

[51] Int. Cl.⁶ ............................................ H04M 3/42
[52] U.S. Cl. .................... 379/243; 379/45; 379/197; 379/201
[58] Field of Search ........................ 379/243, 220, 379/246, 207, 196, 197, 201, 221, 45

[56] References Cited

U.S. PATENT DOCUMENTS

| | | |
|---|---|---|
| 4,577,066 | 3/1986 | Bimonte et al. ............... 379/221 |
| 4,756,020 | 7/1988 | Fodale ............................ 379/197 |
| 5,309,504 | 5/1994 | Morganstein ................... 379/67 |
| 5,311,572 | 5/1994 | Friedes et al. .................. 379/67 |
| 5,416,833 | 5/1995 | Harper et al. ................... 379/201 |
| 5,436,957 | 7/1995 | McConnell ..................... 379/197 |

*Primary Examiner*—Ahmad F. Matar
*Attorney, Agent, or Firm*—Lowe, Price, LeBlanc & Becker

[57] ABSTRACT

An Advanced Intelligent Network is disclosed which permits even "disconnected" subscriber equipment to complete calls to the business office of the network operator or to 911 by providing soft dial tone to such users for access to only a limited sub-set of network capabilities. In addition, methods and apparatus are disclosed for coordinating the retrieval and presentation of data related to a particular subscriber's call to a Business Office Representative.

9 Claims, 8 Drawing Sheets

METHOD AND APPARATUS FOR PROVIDING SOFT DIAL TONE USING OFFICE EQUIPMENT DESIGNATORS

TECHNICAL FIELD

The invention is directed to telecommunications and more particularly to telecommunication networks and the identification of users of such networks.

BACKGROUND ART

Figure 1:
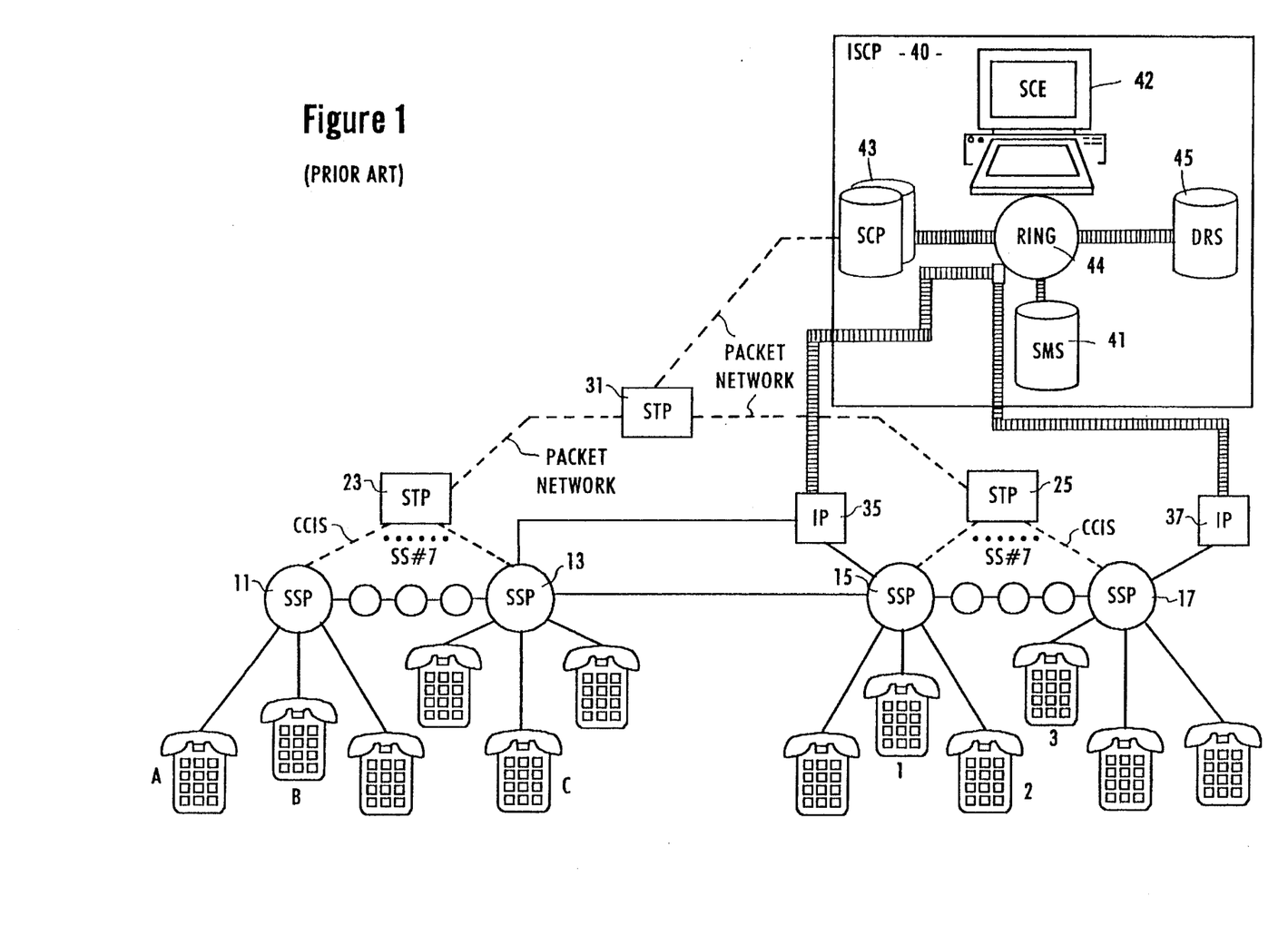
FIG. 1 illustrates, in simplified block diagram form, an Advanced Intelligent Network System of the type utilized with this invention.

In the field of telecommunications, network operators can provide new kinds of services based on an Advanced Intelligent Network (AIN) architecture, such as the AIN architecture illustrated in FIG. 1.

Local (11, 13, 15 and 17) and/or toll (23, 25 and 31) offices of the public telephone network detect one of a number of call processing events identified as AIN "triggers". An office that detects a trigger will suspend call processing, compile a call data message and forward that message via a common channel interoffice signalling (CCIS) link to an Integrated Service Control Point 40 (ISCP). If needed, the ISCP can instruct the central office to obtain and forward additional information. Once sufficient information about the call has reached the ISCP, the ISCP accesses its stored data tables to translate the received message data into a call control message and returns the call control message to the office of the network via a CCIS link. The network offices then use the call control message to complete the particular call. The AIN architecture permits a wide variety of service features that can be customized to suit the needs of each customer.

In the system shown in FIG. 1, the central office switching systems are Service Switching Points, referred to as SSP's. The SSP can be a tandem switch in the interexchange network or an end office in the Local Exchange Carrier network. SSP's are appropriately equipped programmable switches, programmed to recognize AIN type calls, launch queries to the ISCP and receive commands and data from the ISCP to further process the AIN calls. Such central office switching systems include CCIS communications capabilities. An example of such a switch is a 5ESS type switch manufactured by AT&T; but other vendors, such as Northern Telecom and Seimens, manufacture comparable digital switches which could serve as the SSP's. An ideal implementation would make a variety of Advanced Intelligent Network or AIN type services available at all local central offices throughout the network. Other AIN implementations provide the SSP functionality only at selected points in the network, and end offices without such functionality forward calls to one of the SSP's.

The STPs (e.g. 23, 25 and 31) are packet switching nodes, and the SCPs are data bases of circuit, routing, and customer information.

When the SSP receives a service request from a local end office or a user attached on a direct access line, it formats a service request for the SCP and suspends call processing until it receives a reply. The SSP forwards the request to the STP over e.g. a CCIS link and the STP forwards the request to the NISCP 40.

The STPs are interconnected over a high speed packet network that is heavily protected from failure by alternative paths. STPs are deployed in pairs so that the failure of one system will not affect call processing. STPs pass the call setup request to an SCP over direct circuits or by relaying it to another STP.

The SCP is a high speed database engine that is also deployed in pairs with duplicates of the database. The database has circuit and routing information, and for customers that are connected through a virtual network, the database contains customer information such as class of service, restrictions, and whether the access line is switched or dedicated. The SCP accepts the query from the STP, retrieves the information from the data base, and returns the response over the signalling network. The response generally takes the same route as the original inquiry.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. The central offices or SSP's are interconnected to each other by trunk circuits (illustrated in FIG. 1 as bold lines) for carrying telephone services.

The local area STP's 23 and 25, and any number of other such local area STP's communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches.

The links between the central office switching systems 'and the local area STP's 23 and 25 are typically SS7 (Signalling System 7) type CCIS interoffice data communication channels. The local area STP's are in turn connected to each other and to the regional STP 31 via a packet switched network. The regional STP 31 also communicates with the ISCP 40 via a packet switched network.

The above described data signalling network between the SSP type central offices and the ISCP is preferred, but other signalling networks could be used. For example, instead of the CCIS links, STP's and packet networks, a number of central office switches and an ISCP could be linked for data communication by a token ring network. Also, the SSP capability may not always be available at the local office level, and several other implementations might be used to provide the requisite SSP capability.

The messages transmitted between the SSP's and the ISCP are all formatted in accord with the Transaction Capabilities Applications Protocol (TCAP). The TCAP protocol provides standardized formats for various query and response messages. Each query and response includes data fields for a variety of different pieces of information relating to the current call. For example, an initial TCAP query from the SSP includes, among other data, a "Service Key" which is the calling party's address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" messages for instructing the SSP to play an announcement or to play an announcement and collect digits.

There could be one or more ISCP's per political subdivision such as a state, to avoid overloading existing CCIS data links. Alternatively, the ISCP could be implemented on a LATA by LATA basis or on a regional operating company basis, i.e., one data base for the entire geographic area serviced by one of the Regional Bell Operating Companies. In fact, if federal regulations permitted, the data base service could become nationwide.

As shown in FIG. 1, the ISCP 40 is an integrated system. Among other system components, the ISCP 40 includes a Service Management System (SMS) 41, a Data and Reporting System (D&RS) 45 and the actual database referred to as a Service Control Point (SCP) 43. The ISCP also typically includes a terminal subsystem referred to as a Service Creation Environment or SCE (not shown), for programming the data base in the SCP 43 for the services subscribed to by each individual business customer.

Although shown as telephones in FIG. 1, the subscriber station terminals can comprise any communication device compatible with the line. Where the line is a standard voice grade telephone line, for example, the terminals could include facsimile devices, modems, etc.

Each central office switching system or SSP normally responds to a service request on a local communication line connected thereto, for example an off-hook followed by dialed digit information, to selectively connect the requesting line to another selected local communication line. The connection may be made locally through only the connected central office switching system. For example, for a call from station A to station B the SSP 11 provides the call connection without any connection to another central office. When the called line connects to a distant station, for example, when station A calls station C, the connection is made through the connected central office switching system SSP 11 and at least one other central office switching system SSP 13 through the telephone trunks interconnecting the two central office switches.

In one type of call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices and further processing is necessary.

If the call were connected serially through the trunks and appropriate central offices between the caller and the called party using in-band signalling, the trunks would be engaged before a determination is made whether the called line is available or busy. A called line busy condition would unnecessarily tie up limited trunk capacity, a problem which led to the development of the CCIS system.

In the CCIS type call processing, the local central office suspends the call and sends a query message through one or more of the STP's. The query message goes to the central office to which the called station is connected, referred to as the "terminating" central office. For example, for a call from station A to station C, the query would go from originating SSP 11 to terminating SSP 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends a ringback tone back through the connection to the calling station.

The call processing routines discussed above are similar to those used in existing networks to complete calls between stations. In an AIN type network system, these normal call processing routines would still be executed for completion of calls between customer stations, when call processing does not involve one of the AIN services.

In an AIN type system, such as shown in FIG. 1, certain calls receive specialized AIN type processing under control of data files stored in the SCP database 43 within the ISCP 40. In such a network, the SSP type local offices of the public telephone network detect a call processing event identified as an AIN "trigger". For ordinary telephone service calls, there would be no event to trigger AIN processing; in such cases the local and toll office switches would function normally to process the calls as discussed above, without referring to the SCP database for instructions. An SSP type switching office which detects a trigger, however, will suspend call processing, compile a TCAP formatted call data message and forward that message via common channel interoffice signalling (CCIS) link and STP(s) to the ISCP 40 which includes the SCP database 3. This TCAP query message contains a substantial amount of information, including, for example, data identifying the off-hook line, the number dialed and the current time. Depending on the particular AIN service, the ISCP uses a piece of data from the query message to identify a subscriber and access the subscriber's files. From the accessed data, the ISCP determines what action to take next. If needed, the ISCP can instruct the central office to obtain and forward additional information, e.g., by playing an announcement to receive and collecting dialed digits or to receive voice input. Once sufficient information about the call has reached the ISCP, the ISCP accesses its stored data tables to translate the received message data into a call control message. The call control message may include a substantial variety of information including, for example, a destination number and trunk group selection information. The ISCP 40 returns the call control message to the SSP which initiated the query via CCIS link and the STP(s). The SSP then uses the call control message to complete the particular call through the network.

Figure 2:
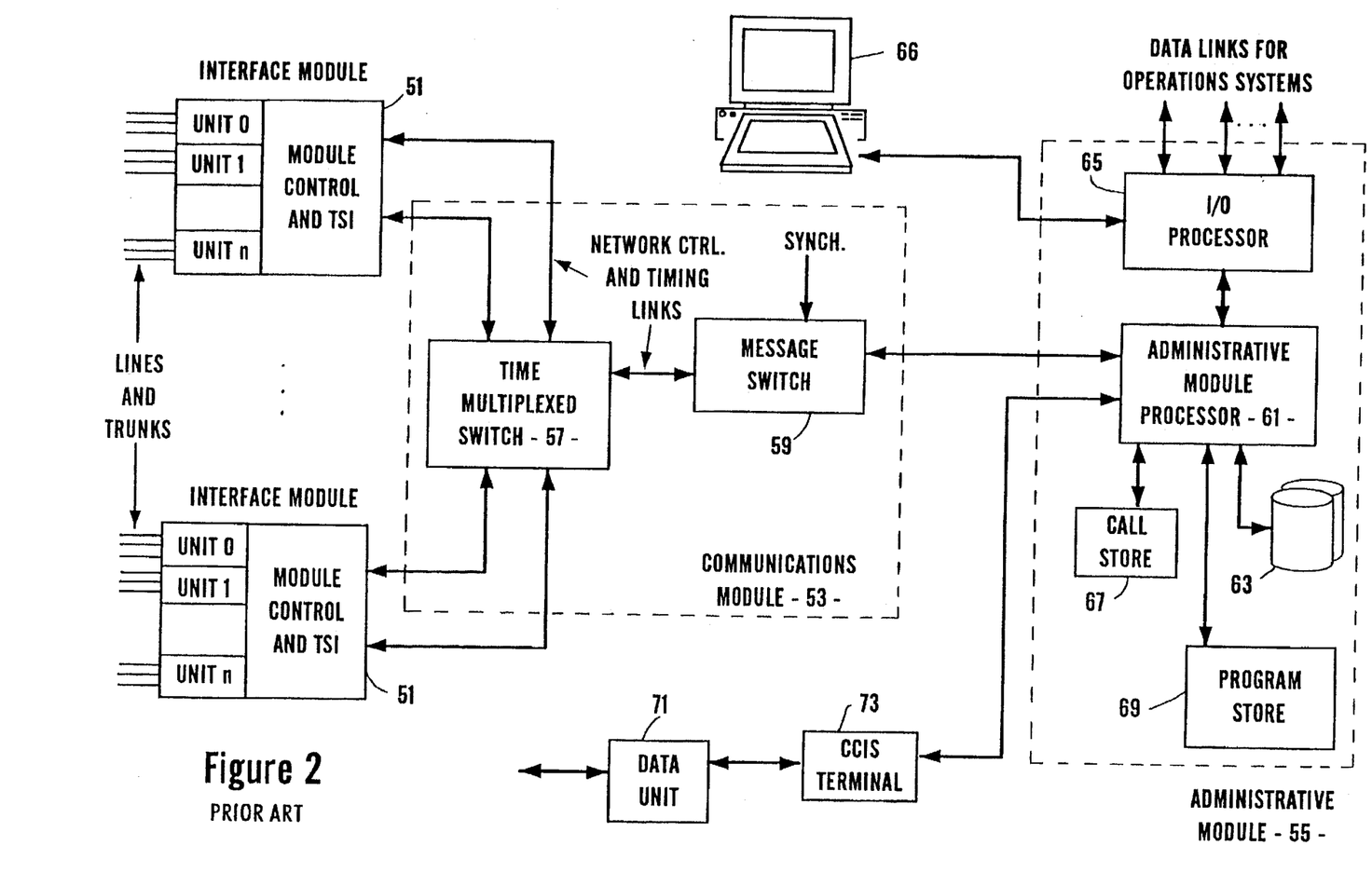
FIG. 2 shows an SSP switch of the type utilized in FIG. 1.

FIG. 2 shows in somewhat more detail a typical central office switching system such as those labeled SSP in FIG. 1. In such a switch, line interface modules provide the interface between a time multiplex switch 57 and the physical wiring plant connecting individual subscribers to the central office. The administrative module 55 contains a processor 61 along with program storage 69, call storage 67 and general storage 63. I/O processor 65 interfaces terminals 66 by which operational personnel can administer the system and by which the various operational systems associated with running a network can gain access to the switch and the information contained therein. CCIS terminal 73 and data unit 71 provide an interface to the CCIS network as described above. Message switch 59 links the time multiplex switch 57 and the various control lines with the administrative module processor 61.

Figure 3:
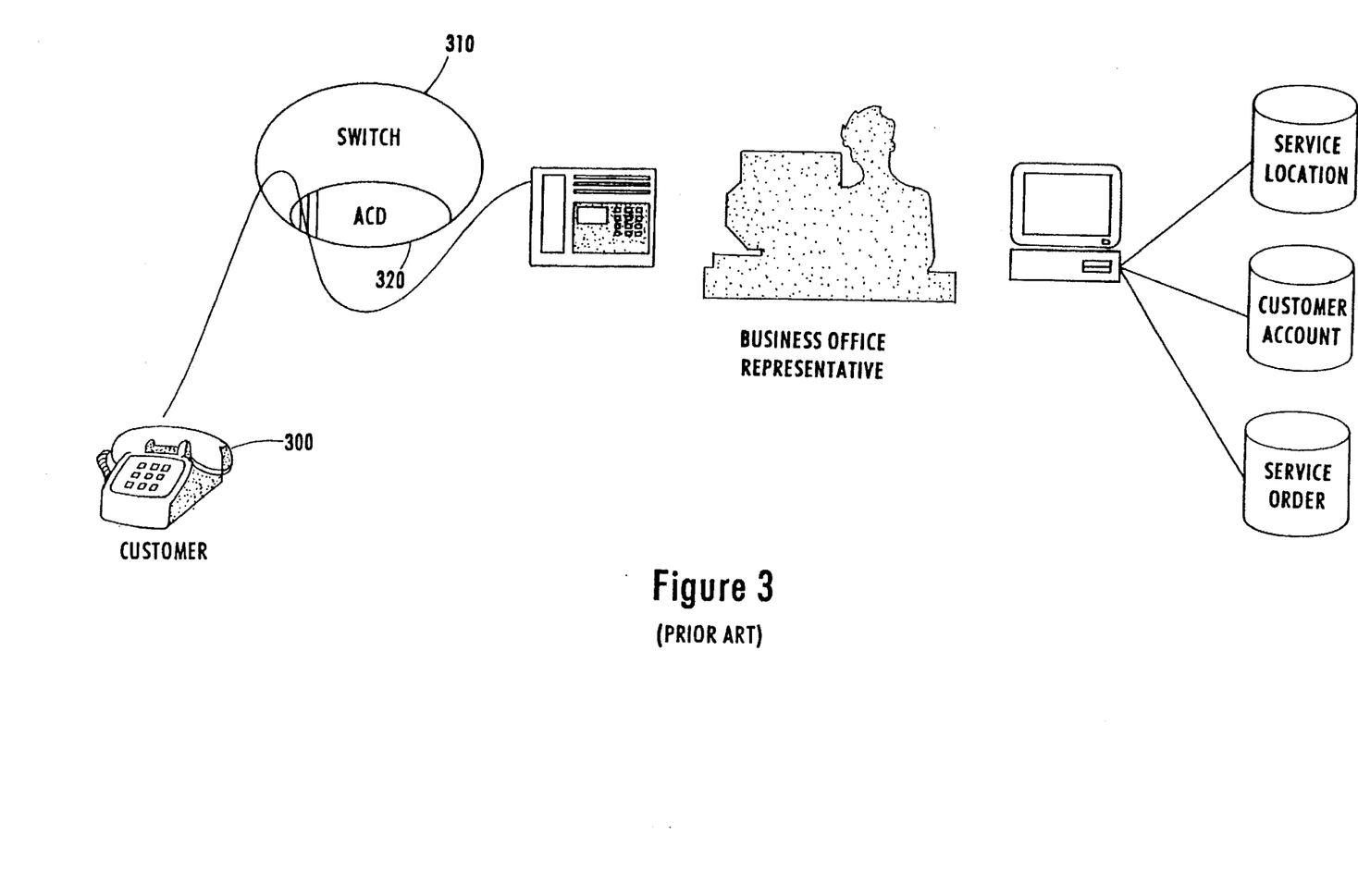
FIG. 3 illustrates the handling of telephone calls to the business office as done in the prior art.

In the course of business, the network operator must frequently handle requests from customers or potential customers, such as requests to provide new service, changes to existing service, disconnection of service and transfer and forward of service from one location to another. FIG. 3 illustrates how this is done conventionally. The customer places a call to the business office of the network operator, which call is routed through a switch 310 to an automatic call distributor 320 (which may be a software service provided by the switch) where the call is queued, if necessary, to await the availability of the next Business Office Representative or operator. When a Business Office Representative becomes available, the call is completed to a telephone at that representative's location. The representative inquires as to the nature of the transaction required to assist the calling customer. Typically, when the Business Office Representative determines the identity of the calling party, or the location with respect to which the request for service is directed, the Business Office Representative will access a computer terminal, also at the representative's location, to access data bases containing information about service location and capabilities and customer accounts. The representative will eventually generate a service order to accommodate the request(s) of the calling customer.

Figure 4:
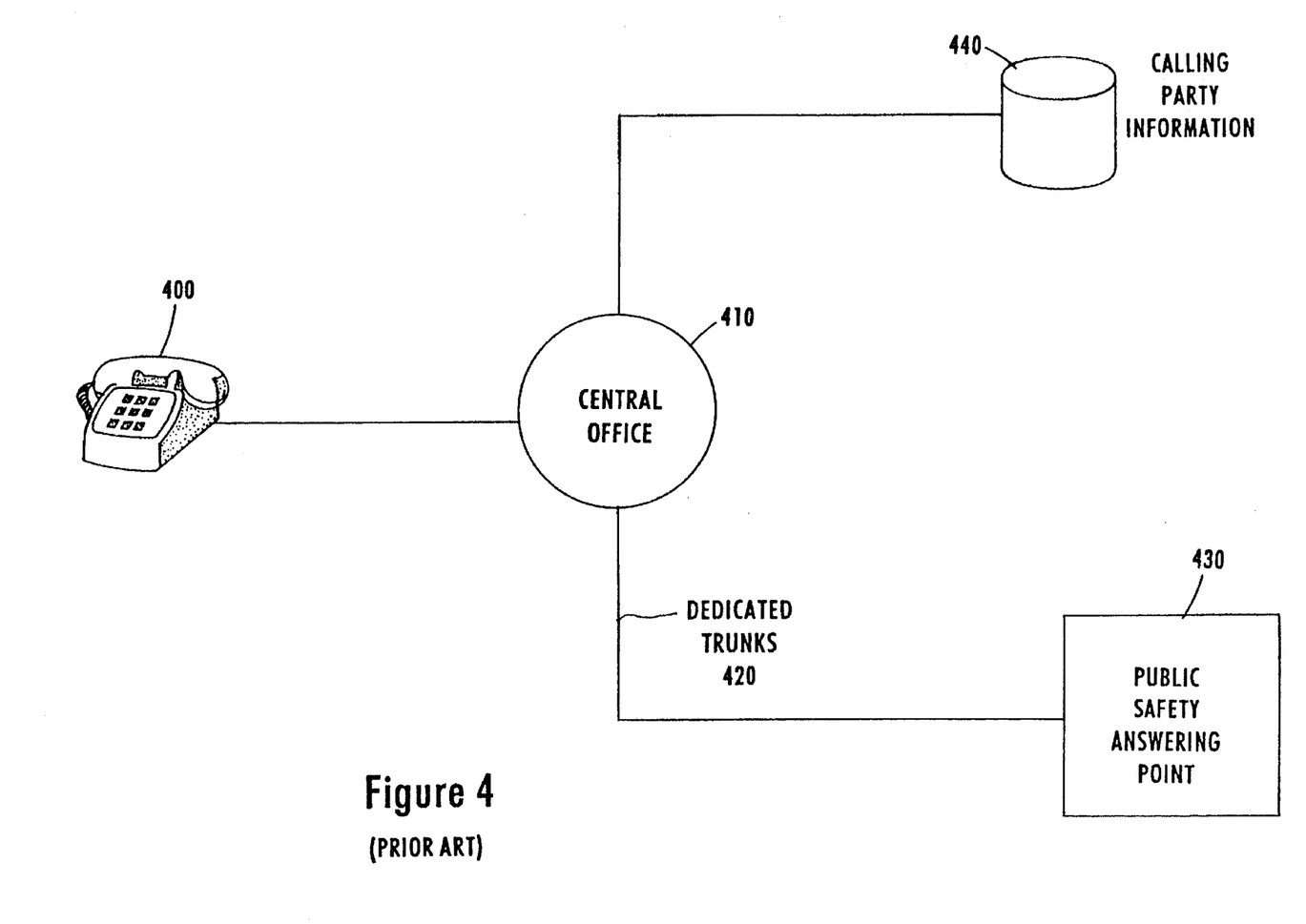
FIG. 4 illustrates the handling of 911 emergency calls in the prior art.

FIG. 4 depicts use of the dialing code 911 which is dedicated to public service emergency numbers such as fire, police and ambulance. The local central office 410 switches a 911 call to a dedicated group of trunks 420 which connects to a Public Safety Answering Point (PSAP) 430. Calls can be routed over the switched network to the PSAP, but as there is a risk that calls may be blocked by normal telephone traffic, dedicated lines are normally used. The PSAP is staffed with personnel who have been trained in emergency call handling procedures. Emergency centers can be classified as Basic 911 (B-911) or Enhanced 911 (E-911). Electromechanical offices can route calls to the PSAP, but most 911 features require stored program central offices.

The telecommunications equipment in a B-911 center can be as simple as key telephone service, or calls can be delivered to an automatic call distributor (ACD).

Emergency operators can be given features that enable them to trace calls and hold up a circuit to re-ring the calling party to obtain more information, but they normally cannot identify the caller.

To provide calling party identification, the network operator or other bureau maintains a data base 440 of calling party information that is furnished to the PSAP if E-911 service is used. Besides the originating telephone number, the data base furnishes name and address, the address of the nearest emergency facility, and identification of which facility has emergency jurisdiction. Besides automatic number and location identification, E-911 provides elective routing, which, for overlapping jurisdictions, routes the call to the appropriate PSAP.

Handling of E-911 calls and calls to the business office, described above, is not always satisfactory. When handling calls to the business office, the customer must wait while the customer service representative looks up the service location, the customer's account information and generates a service order.

Another problem with the prior art described above, is that system users cannot place a call to the business office or to 911 from a "disconnected" telephone. It would be desirable to permit a user to order telephone service from the business office using the existing wiring between the user location and the central office, even when that line has been "disconnected". It would also be desirable to permit such a user of a "disconnected" telephone line to be able to acquire emergency services.

DISCLOSURE OF THE INVENTION

One object of this invention is to provide restricted telephone service to disconnected telephone lines so as to permit calls to be made to the business office and/or to 911.

Another object of the invention is to provide improved service to calls to the business office of the network operator by reducing wait and processing times.

Another object of the invention is to reduce service order negotiation time by automatically filling in several fields of data required for the order processing such as the customer's location address or serving switch and to reduce the number of errors and thus the amount of rework required during service order negotiations. The previous customer's data for a "disconnected" line becomes the primary copy of data for populating order processing screens used by the Business Office Representative.

These and other objects of the invention are achieved by providing a telephone switching network which provides soft dial tone, that is, dial tone which permits access to only a limited sub-set of network services available to normal subscribers, to network lines which are "disconnected".

When subscribers are "disconnected" they are only logically disconnected, that is, they are placed in an inactive status without physically disconnecting them from the network. In accordance with the invention, subscribers in a disconnected (inactive) status are provided with soft dial tone whereby they may access only a limited number of network services such as 911 emergency dialing and the placing of calls to the telephone company business office. Provision of these limited services is possible because the office equipment number rather than the telephone number (which is not valid for a disconnected user) of the telephone line at the user's location is used to identify the line requesting service.

Another aspect of the invention involves methods and apparatus for handling of calls placed to a business office over a telephone network using combined voice and data. Either the telephone number or the office equipment number is used to identify the telephone line at the user's location. Using either number, information about the calling subscriber or the user's location is retrieved. Once the retrieved information is available, the information is queued with the call for service by a Business Office Representative. When the call advances to the top of the queue and the representative is ready to service the next call, the information is applied to a data terminal of said representative concurrently with connecting said call to a telephone of said representative.

The invention is also directed to methods and apparatus for providing emergency communications in which subscribers are disconnected by placing them in an inactive status without physically disconnecting them and dial tone is provided to subscribers in an inactive status so that subscribers in an inactive status may access only a limited number of network services such as placing emergency calls to 911 or placing calls to the business office of the telephone company.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of instrumentalities and combinations pointed out in the appended claims.

BEST MODE FOR CARRYING OUT THE INVENTION

Figure 5:
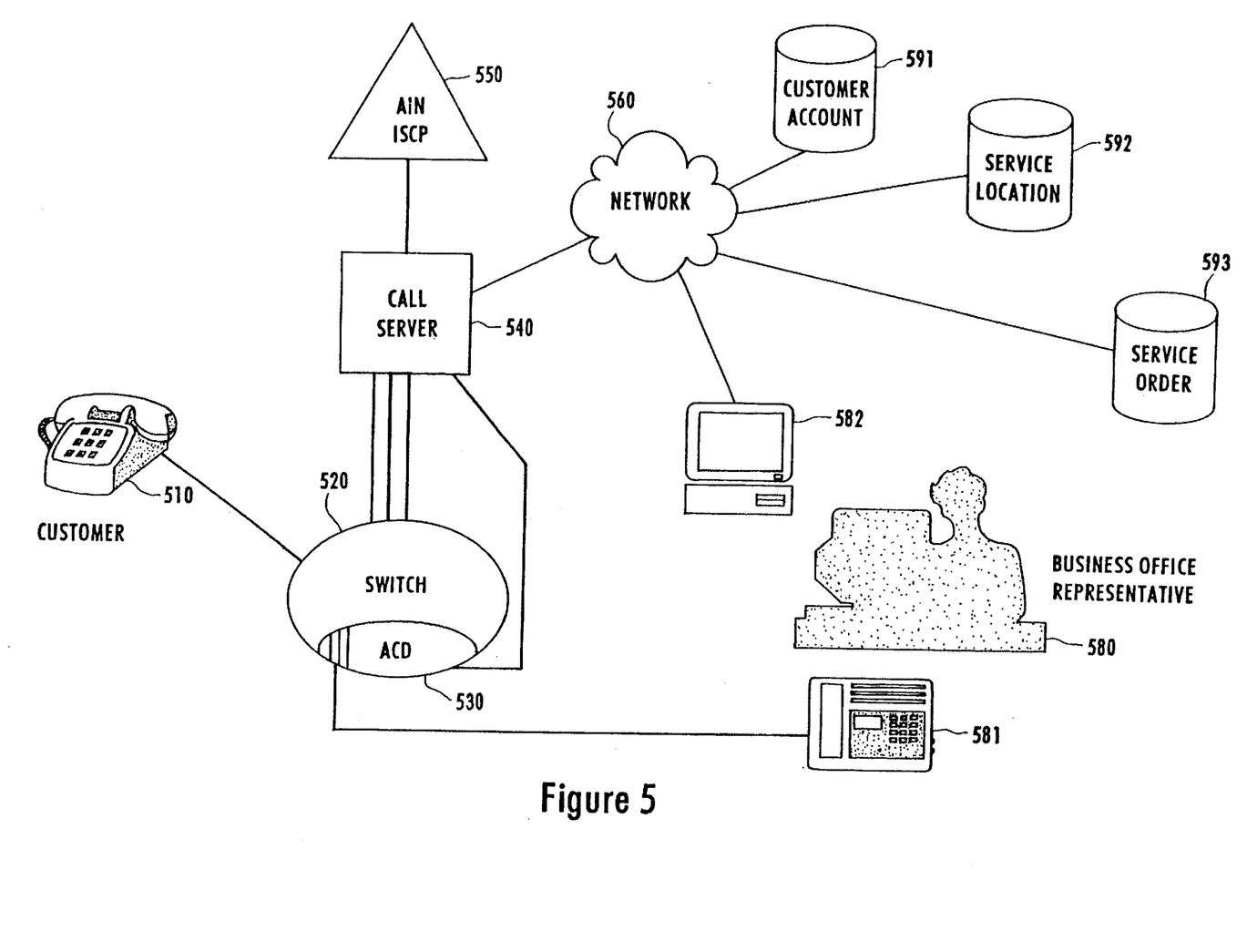
FIG. 5 illustrates the use of coordinated voice and data in the servicing of business office requests.

FIG. 5 illustrates a network architecture and methods and operations for handling incoming calls to the business office in a manner which coordinates voice and data information.

In FIG. 5, switch 520 represents a central office switch servicing customer 510 and directly or indirectly servicing the business office. Business office representative 580 is equipped with a telephone set 581 and a data terminal 582. A call server 540 is connected to the switch 520 into the AIN ISCP 550 into a data network 560. The business office representative can access a variety of data bases, such as 591, 592 and 593 from his terminal 582 over the data network 560.

Existing subscriber customers who desire new or charged services are handled as follows.

Customer 510 places a call to the network operator business office. Such a call results in trigger which results in a message to the ISCP, as discussed above. Action by the ISCP results in identification of the business office that services the calling customer. A return message to the central office switch directs the switch to connect the customer to an integrated voice response unit (part of call server 540). The integrated voice response unit directs the caller to enter the customer telephone number and, optionally, some indication of the type of service desired. Alternatively, the telephone number of the callers can be detected automatically using known ANI facilities. The telephone number is utilized to access the various data bases 591 and 592 for items of data about the customer account. The type of service desired can be utilized to acquire the proper type of service order from service order data base 593. When the data is available, the caller is placed in the queue of automatic call distributor (ACD) device 530 to await a free Business Office Representative. When the ACD completes the call to a Business Office Representative, the customer account screen, partially or completely filled in, is delivered simultaneously to the representative's work station 582 over the network 560. Thus, the time a calling customer would spend waiting for a free Business Office Representative is utilized to acquire information that will be necessary to servicing the customer's transaction, resulting in more efficient use of both the customer's and the Business Office Representative's time.

Figure 6:
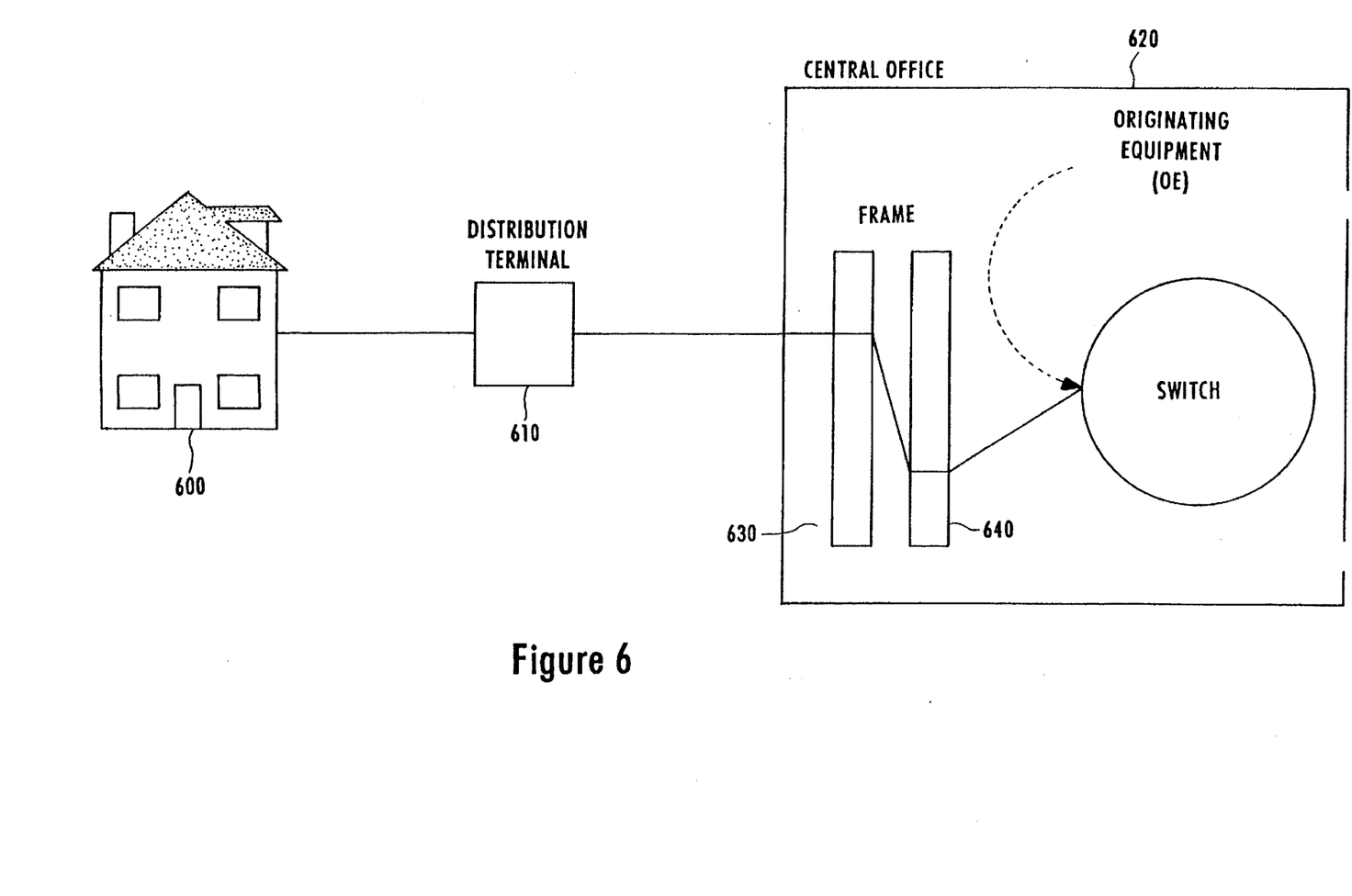
FIG. 6 illustrates the provision of soft dial tone to "disconnected" users based on the office equipment designator at the switch.

FIG. 6 illustrates a typical central office installation with associated wiring plant extending to subscriber premises 600. Wiring frames 630 and 640 terminate the external cables and the switching ports of the switch, respectively. Distribution terminal 610 represents an intermediate distribution point where large cables (e.g., a thousand pair cable) are terminated and connected to smaller cables (e.g., ten hundred pair cables) destined for different locations. In the central office, a connection between wiring frame 630 and wiring frame 640 associates a particular line pair, directed to subscriber premises 600, with a particular switch port which has an originating equipment designation number (i.e., the line number, port number or address, of the subscriber who originates a call as opposed to terminating equipment number) identified with it on the switch. When a telephone number is assigned, a logical association is created in the data storage of the switch between the telephone number and the originating equipment number associated with the line pair going to the subscriber's premises to whom the telephone number is being assigned. When service is to be disconnected to a particular subscriber location, conventionally, the link between wiring frame 630 and wiring frame 640 is removed so that the subscriber cannot obtain access to the services provided by the switch. In accordance with the invention the link is left in place even in a "service disconnect" status. A subscriber will be "disconnected" from service logically in the switch data base without a physical disconnection. This permits "soft dial tone" functionally to be provided to the user. Premises 600, even though a non-subscriber, will have access to a dial tone, restricted to access a limited subset of network services. Calls to the business office to establish service or, to 911 emergency services will be permitted, for example.

Figure 7:
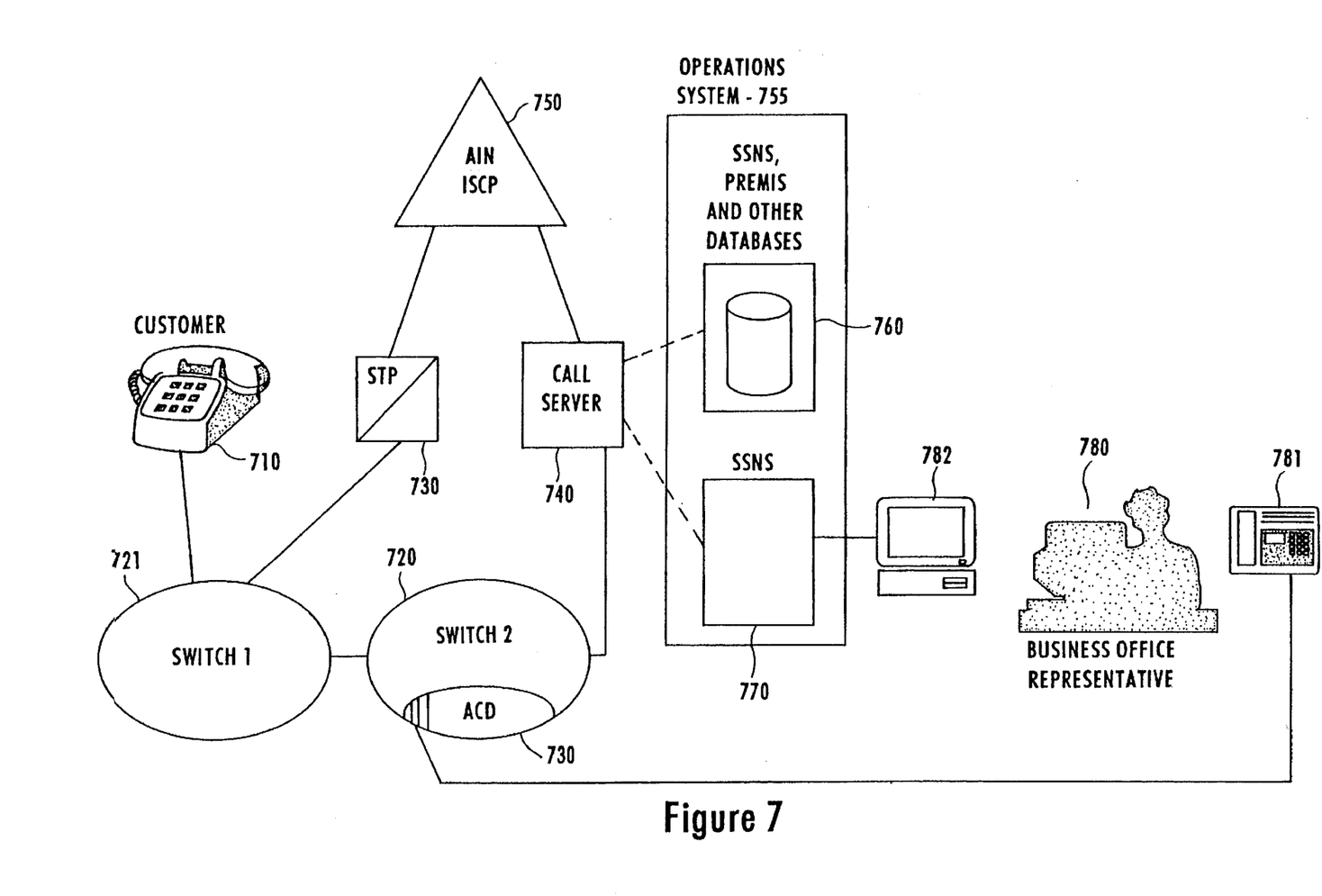
FIG. 7 is a representation of a network architecture which utilizes soft dial tone and coordinated voice and data in servicing 911 emergency calls and/or calls to a business office of the network operator.

FIG. 7 illustrates a network architecture which supports both the use of soft dial tone and coordinated voice and data. The link between customer 710 and switch 721 in FIG. 7 is essentially that shown in FIG. 6.

In FIG. 7, customer 710 is connected to switch 721. Switch 721 connects to switch 720 and to the AIN ISCP 750 through STP 730. Call server 740 receives information from AIN ISCP 750 and accesses data bases 760 and 770 of operation system 755. To extract information from the data base it is necessary to service the request from the calling customer 710. Switch 720 is also connected to call server 740. Switch 720 has an automatic call distribution service 730 which queues calls to the business office representative 780 at the representative's telephone 781. Business office representatives data terminal 782 receives data screens via the SSNS system 770.

Figure 8:
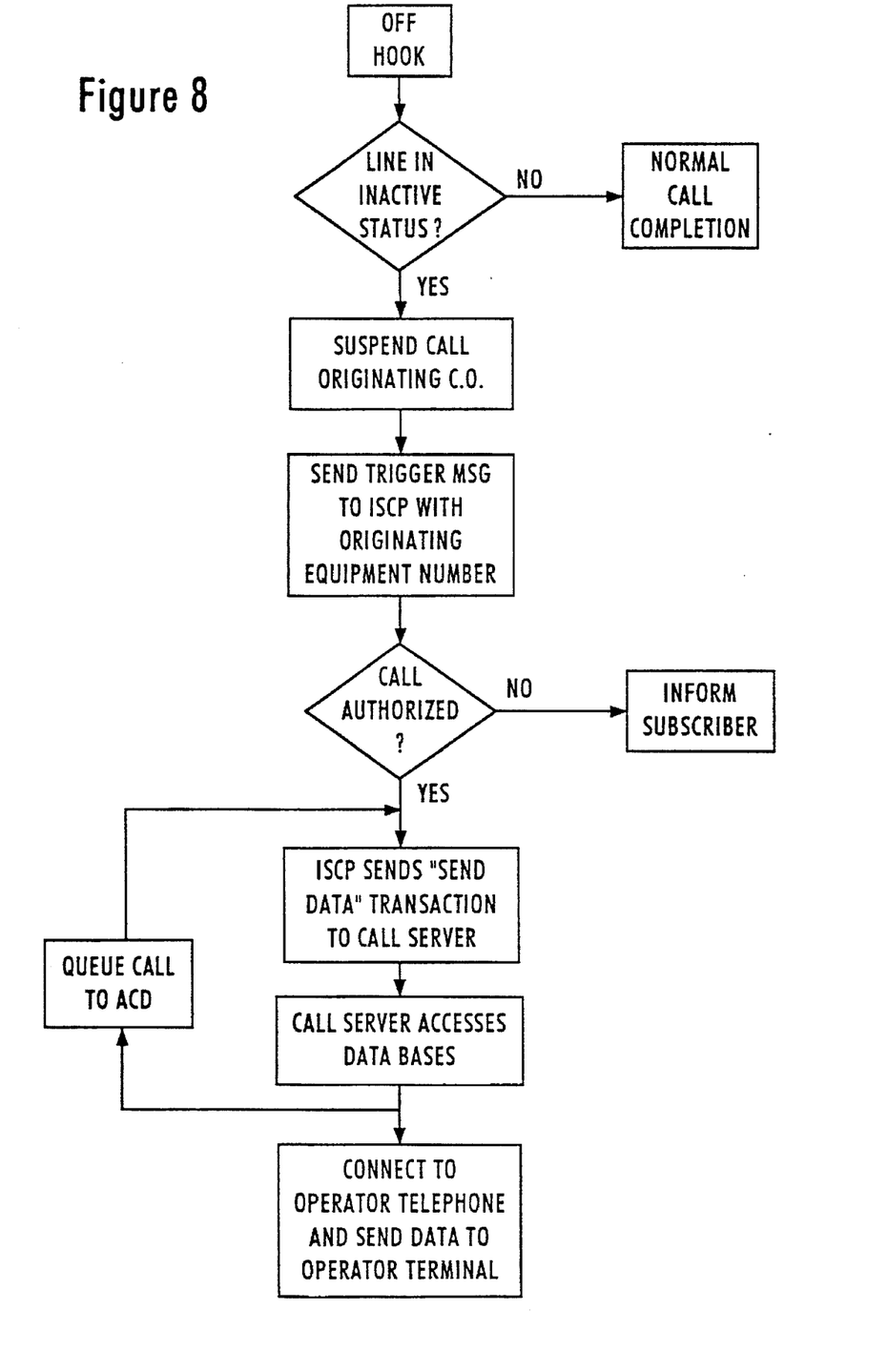
FIG. 8 is a flow chart representation of the operation of the network of FIG. 7.

The operation of the network of FIG. 7 in completing a call from a customer to a business office will now be discussed in detail in conjunction with the flow chart of FIG. 8. The customer picks up a phone which is provided with soft dial tone service (which may also be called "disconnected service" or "restricted service") as indicated in FIG. 6 and if the customer is utilizing a phone which has been "disconnected", the customer may only call the business office or 911. Since the "disconnected" phone has soft dial tone capabilities, the customer's line is connected to originating equipment on the switch as shown in FIG. 6. This originating equipment has an AIN originating trigger set on it. Given the trigger, control of the call is passed to the AIN platform. The originating equipment number and the signaling point code (SPC) are sent to the AIN ISCP in the transportation capabilities application part (TCAP) payload within an SS7 message. SS7 refers to a common channel signaling network as per specifications issued by the CCITT. The AIN ISCP initiates a Send Data transaction to the call server. The Send Data transaction includes the identity of the office equipment number and the SPC. Given these items of data, the Operations System 755, a computer system supporting network operations, can uniquely identify a particular switch port and retrieve information about that port. The AIN waits for a response from the call server.

In response to the Send Data message from the ISCP, the call server places the office equipment number and the SPC inside an OS contract. An OS contract is essentially a formatted request, based on a client server model, to the Operations System. The contract is sent to a Sales Service Negotiation System (SSNS, which is part of the Operations System) in order to retrieve information about the last customer who had that office equipment number. That information includes house address, serving central office, cable plant facilities and other relevant data.

The contract is sent over a supporting network to the SSNS where it is utilized to retrieve the address and other data and return them to the call server with the contract response required to populate an agent's work station with the information required for the transaction involved. The call server will store the response in memory until the time the automatic call distribution (ACD) system completes the call to an available Business Office Representative. The call server informs the ISCP that the Send Data has been completed.

Once Send Data has been successfully completed, the AIN-ISCP instructs the switch to transfer the call to the telephone number of an ACD queue. This queue serves agents within a business office and will likely reside on another switch 720 (switch 2). The ACD automatically monitors all calls waiting in the queue. As calls are connected to an agent, the ACD sends call completion information (such as the telephone number of the agent to which the call is connected) to the caller server. The call server determines the appropriate work station identifier for the agent based on a table containing the agents' telephone numbers and their corresponding work station identifiers.

The call server then places the work station address into the service negotiation screen which has been stored earlier. The modified terminal session transaction involving the service negotiation screen will then be placed back on the network and sent to the agent. The service negotiation system (SSNS) 770 will receive the transaction and place the screen on the agent's work station.

Thus, the agent has at his disposal all relevant information available about the caller and the type of transaction desired. This will facilitate a reduction in the interaction time with the caller and in the time needed to service the caller's business.

It should be apparent that the same type of coordinated voice and data process can be utilized to service 911 calls.

In this disclosure, there is shown and described only preferred embodiments of the invention, but it should be understood that the invention is capable of use in various other combinations and environments capable of changes or modifications within the scope of the inventive concepts as expressed herein.

We claim:

1. In a telephone communications system including a plurality of subscriber telephone lines, each coupled to an associated telephone switching facility in a communications network, and an integrated service control point (ISCP) remotely located from said telephone lines and associated switching facilities, said ISCP having stored therein a limited number of network service telephone numbers, a method comprising:

deactivating all subscriber calling services to a selected telephone line of a subscriber, who has requested termination of said services, without physically disconnecting the line from associated switching facility equipment;

setting an off-hook trigger at the switching facility equipment associated with said line;

providing dial tone to said line in response to an off-hook condition on said line;

receiving, at the associated switching facility, dial signals for a call that originates from said line; and routing said call to completion only if said dial signals correspond to one of the limited numbers stored in the ISCP.

2. The method of claim 1 in which the trigger is associated with said selected line on the basis of line equipment number.

3. The method of claim 1 in which the trigger is associated with said selected line on the basis of the telephone number of said line.

4. A method as recited in claim 1 in which said limited number of network service telephone numbers includes 911 emergency service.

5. A method as recited in claim 1 in which said limited number of network service telephone numbers includes a business office number or a repair bureau number of the network operator.

6. In a telephone communications system including a plurality of subscriber telephone lines, each coupled to an associated telephone switching facility in a communications network, and an integrated service control point (ISCP) remotely located from said telephone lines and associated switching facilities, said ISCP having stored therein a limited number of telephone numbers of network service operators, a method comprising:

deactivating all subscriber calling services to a selected telephone line of a subscriber, who has requested termination of said services, without physically disconnecting the line from associated switching facility equipment;

providing dial tone to said line in response to an off-hook condition on said line;

receiving, at the associated switching facility, dial signals for a call that originates from said line;

determining whether said dial signals match one of said stored telephone numbers;

detecting an equipment number associated with said selected line;

retrieving information about a location of said selected line based on said equipment number;

routing said call to an operator station only if said dial signals correspond to one of the limited numbers stored in the ISCP; and applying said information to a data terminal of said operator station concurrently with connecting said call to a telephone of said operator.

7. The method of claim 6 in which the operator is a public service access point operator.

8. The method of claim 6 in which the operator is a business office representative.

9. A method as recited in claim 6 further comprising:

queuing said call if said operator station is in busy status; and automatically connecting said call to said operator station in queue order after said busy status is terminated.

* * * * *